Jan. 5, 1937.  H. E. LACY  2,066,476
SELF HEATING UTENSIL
Filed Nov. 9, 1935  2 Sheets-Sheet 1
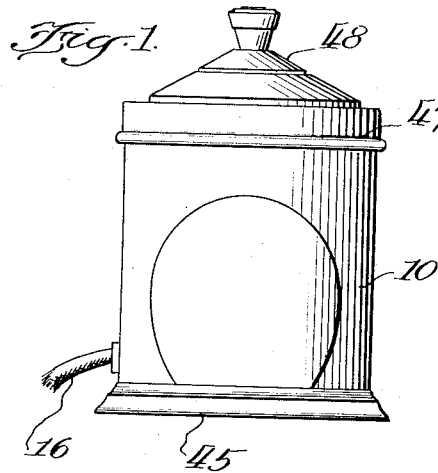
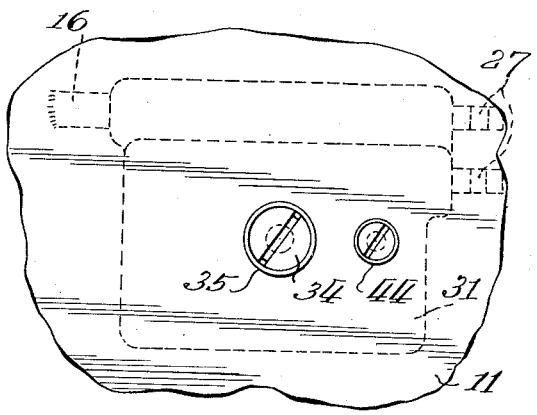
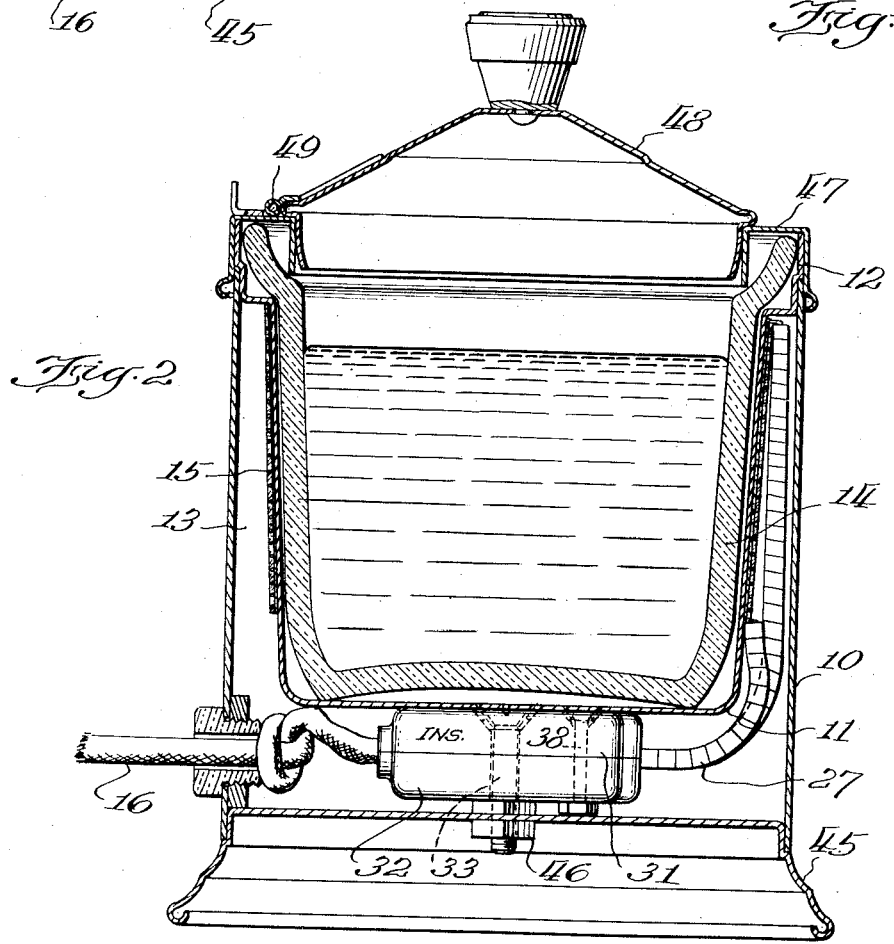
Inventor
Herman E. Lacy

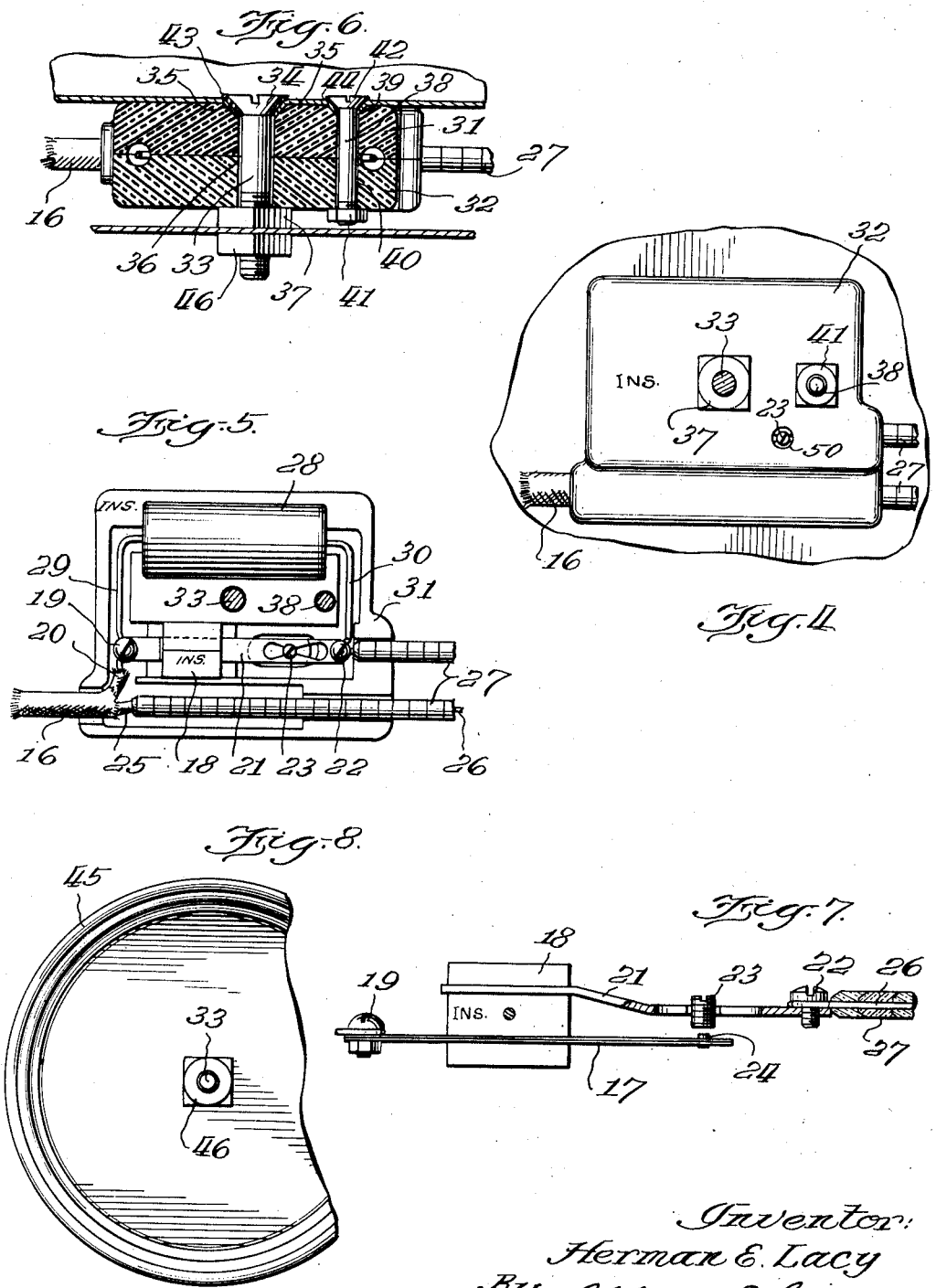

Patented Jan. 5, 1937

2,066,476

UNITED STATES PATENT OFFICE 2,066,476

SELF-HEATING UTENSIL

Herman E. Lacy, Chicago, Ill.

Application November 9, 1935, Serial No. 48,954

5 Claims. (Cl. 219—43)

The invention relates generally to a heating utensil, and more particularly to a vessel with self-contained means for heating its contents.

It is an object of this invention to provide in a self-heating vessel of the character described novel and improved means for protecting the same from injury and destruction due to overheating, which object may be secured by the provision of a circuit opening and closing device associated with the vessel in a novel manner and controlled by predetermined temperatures of the heated device.

Another object of the invention is the provision in a self-heating vessel of the character described having automatic heat control means associated therewith of novel and improved means for encasing said heat control means whereby the same may be protected against moisture and other deteriorating influences which may tend to injure the same.

A still further object of the invention is to provide in a device of the character described having a heat control unit associated therewith novel and improved means for mounting said unit in operative position, which means will protect the said unit from moisture and the like, thereby greatly prolonging the life of the unit.

A still further object of the invention is to provide in a self-heating utensil of the character described having a heating element and heat control means for said element of novel and improved insulating means for protecting the terminals connecting the heating element with the heat control means in such a manner as to prevent the absorption of moisture thereby, thereby eliminating the danger of short circuits or the like.

A still further object of the invention is to provide a novel and improved self-heating utensil having heat control means associated therewith and the construction of which will be simple both in operation and assembly and which may be constructed along lines convenient for low cost manufacture while at the same time being highly efficient for carrying out the purposes for which it is designed.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings, a preferred embodiment thereof, from an inspection of which when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Figure 1 is a side elevational view of a heating vessel constructed in accordance with the present invention;

Fig. 2 is a central vertical cross sectional view through the same with the casing housing the heat control means being shown in elevation;

Fig. 3 is a view looking into the inner container of the vessel and showing the fastening means for the heat controlled unit;

Fig. 4 is a bottom plan view of the casing housing the heat controlled unit;

Fig. 5 is a view similar to Fig. 4 with one-half of the casing removed;

Fig. 6 is a sectional view through the casing with the fastening means therefor being shown in elevation;

Fig. 7 is a side elevational view through the thermostatic means forming the heat controlled unit; and Fig. 8 is a fragmentary bottom plan view of the vessel shown in Fig. 1.

The invention is here shown embodied in a vessel used for heating fudge or other similar product, and in the embodiment illustrated, said vessel contains an outer hollow shell 10 of any suitable material, such, for example, as aluminum, stainless steel, or the like. The shell 10 is open at both ends and has received therein in central relation thereto an inner container 11 which may be formed of material similar to that of which the shell 10 is formed.

The container 11 has an annular outwardly extending flange 12 formed adjacent its upper end, which flange is adapted to rest on the free upper edge of the outer shell 10 when the device is in assembled position. The container 11 is of smaller diameter than the outer shell 10 so as to form when in assembled position the air space 13 between the same. The container 11 is open at its upper end, but closed at its bottom end, which end extends inwardly of the lower edge of the outer shell to provide a space below the same for housing the casing within which the heat controlled unit is mounted, as will be hereinafter more fully described. Adapted for disposition within the container 11 is a suitable bowl 14 which may be of any suitable material, such, for example, as shenango china or the like, and within which the ingredients to be heated may be disposed.

As already stated, the vessel is of the self-heating type and the heat is supplied thereto by the electric heating element, generally designated by the reference character 15, which element preferably consists of an electrically heating resistance which is supplied with electric current through means of the flexible conductor 16 leading from the house supply. The heating element is arranged around the inner container 11 and is securely held in place thereabout in any suitable and well known manner.

In order to prevent injury to the device due to overheating, and the like, and to automatically control the supply of heat thereto, I have provided in association with the heating element 15 a thermostatically controlled mechanism which, as illustrated in Fig. 7, includes a bi-metallic thermostat 17 carried by a block of insulating material 18 and within which it is rigidly secured intermediate the ends thereof. On one end of said bi-metallic thermostat 17 is provided a terminal 19 to which is secured, as shown in Fig. 5, the conductor 20 of the current supply line 16.

Co-operating with said thermostat 17 for opening and closing the circuit to the heating element is a metal bar 21, one end of which is rigidly secured in the insulated block 18 and to the other end of which is secured one end of the resistance element 15 by means of the terminal 22. The body portion of the bar is disposed directly above the thermostat 17 and has an adjustable screw 23 threaded thereinto intermediate the ends thereof for engagement with the contact 24 provided adjacent the free end of the thermostat bar 17.

Thus when the screw 23 is in contacting engagement with the contact 24 the circuit to the heating element 15 will be closed, and heat supplied to the vessel. By adjusting the screw 23 in the bar 21 it will be readily apparent that the temperatures at which the circuit may be made or broken may be varied as desired. The other end of the resistance element 15 is secured to the conductor 25 of the flexible tube 16. Thus a circuit may be completed to the heating element through the conductor 20, thermostat 17, bar 21, one end of the end of the heating element, the heating element itself, the other end of said heating element and the conductor 25. This circuit will remain closed until such time as the temperature will be effective for flexing the thermostat 17 to a position where it will break contact with the member 23, thereby opening the circuit to the heating element.

In order to prevent the absorption of moisture and to ensure proper insulation for the end terminals of the heat element 15, the conductors 25 and 26 leading from said resistance are encased in suitable insulating beads 27, which may be formed from any suitable material, such, for example, as glass, lava, and the like. This form of insulation will prevent the absorption of moisture and thus eliminate the danger of short circuits as is the case with asbestos tubing and the like heretofore used in devices of this character.

The life of the heat control unit is further prolonged by the provision of a suitable arc-absorbing device, generally designated by the reference character 28, which may be of suitable and well known construction and which is placed in the circuit by connecting wires, 29 and 30 to the terminals 19 and 22, respectively.

The life of the heat control mechanism is further prolonged by completely enclosing the same in a suitable casing which will not only protect the mechanism from moisture and other deteriorating influences, but will also prevent tampering with the same by unexperienced persons.

Thus in the embodiment illustrated, there is provided a novel construction of housing wherein the entire heating control mechanism may be completely encased. Said casing includes a pair of complementary shells 31 and 32 made of suitable insulating material, such, for example, as Bakelite, or the like. Said shells 31 and 32 are suitably recessed to permit the disposition therein of the thermostat 17 with its insulating member, the arc-absorbing device 28, the wires 29 and 30, and the terminals 19 and 22 as well as the conductors 25 and 26 with their insulated beads 27. When in closed position the casing will have passages leading therefrom of sufficient size to permit only the passage therethrough of the conduit 16 and the conductors 25 and 26 with their beaded insulation.

The shells 31 and 32 which form the casing are secured to each other and to the device by means of a bolt 33 having the enlarged tapered head 34 which passes through a tapered opening 35 provided in the bottom wall of the inner container 11. This bolt 33 is adapted to pass through a central opening 36 provided in the two shells and on the lower end of said bolt is threaded a nut 37 by means of which the casing in assembled position may be securely fastened to the underside of the inner container 11.

In order to prevent turning or twisting of said casing when the operating condition with resultant injury to the electrical connections associated therewith, there is provided a second bolt 38 which is adapted to extend through the tapered opening 39 provided in the bottom wall of the inner container 11 and through the openings 40 provided in the shells 31 and 32. The lower end of said bolt has threaded thereon a nut 41 for securely fastening the bowl in operative position. The bolt 39 is provided with an enlarged tapered head 32, as shown in Fig. 6.

In order to ensure against the passage of moisture into the casing when the device is being washed, I have provided suitable moisture-proof washers 43 and 44 associated with each of the bolts 33 and 38, said washers snugly fitting around the heads of said bolts, and when in fully assembled position will efficiently insulate the openings 35 and 39 against the passage of moisture from the container 11. The lower half 32 of the casing housing the heat control unit is also provided with an opening 50 through which access may be had to the screw 23 for adjusting the same.

The outer shell 10 has associated therewith a base 45 upon which the entire device may be supported, said base being secured in operative position by the bolt 33 which extends through a central opening provided in said base. A nut 46 is threaded on the free bottom end of said bolt for securely locking the base 45 in operative position.

The device has also associated with it a suitable cover member which comprises an annular ring 47 which is adapted to fit over the upper edges of the bowl 14 and outer shell 10, as shown more clearly in Fig. 2. Said member is provided with a central opening through which access may be had to the inside of the bowl. A suitable cover member 48 is provided for closing said central opening, said cover member being hingedly secured adjacent one end thereof, as shown at 49 to the member 47.

From the above it should be readily apparent that I have provided a device of the character described which will be highly efficient in carrying out the purposes for which it is designed, and which will eliminate a great many of the difficulties heretofore present in devices of this character.

The more important features of this device reside in the provision of the casing completing housing the heat control unit, the provision of the resilient washers for preventing the passage of moisture into said casing, and the improved insulation for the heat resistance terminals to prevent the absorption of moisture thereby.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. The combination with a self-heating vessel including an electrical resistance, an electric circuit within which said resistance is arranged, and means for controlling the closing and opening of said circuit by the temperature of the vessel, said last mentioned means including a thermostat, a switching mechanism controlled by said thermostat for opening and closing said circuit, said thermostat and switching mechanism being completely encased within a casing, said casing comprising a pair of complementary shells and means for securing said shells to each other and to the vessel.

2. The combination with a self-heating vessel including an electrical resistance, an electric circuit within which said resistance is arranged, and means for controlling the closing and opening of said circuit by the temperature of the vessel, said last mentioned means including a thermostat, a switching mechanism controlled by said thermostat for opening and closing said circuit, said thermostat and switching mechanism being completely encased within a casing, said casing comprising a pair of complementary shells and means for securing said shells to each other and to the vessel, said last mentioned means including a bolt member having an enlarged tapered head extending through a similarly shaped opening in the vessel and a flexible washer interposed between said head and said opening, whereby the passage of moisture through said opening will be prevented.

3. In combination with a self-heating vessel, including an inner container surrounded by an outer shell in spaced relation thereto, an electrical resistance wound around said inner container, an electric circuit within which said resistance is arranged, means disposed in said electrical circuit for automatically controlling the heat supply to the container, said means including an adjustable contact and a movable contact carried by a bi-metallic member, and a casing for completely housing said bi-metallic member and fixed contact connected to the underside of said inner casing, and means for preventing the passage of moisture from said inner container to said casing.

4. The combination with a self-heating vessel, including an inner container and an electrical resistance wound around said inner container, an electric circuit within which said resistance is arranged, means for controlling the closing and opening of said circuit by the temperature of the vessel, said last mentioned means including a thermostat, a switching mechanism controlled by said thermostat for opening and closing said circuit, conductors connecting said switching mechanism and thermostat with said electrical resistance, insulating beads surrounding said last mentioned conductors whereby the danger of the absorption of moisture by said conductors will be eliminated, a casing for completing housing said thermostat and switching mechanism, and means connecting said casing to said inner container, said last mentioned means including a fiber washer for preventing the passage of moisture from said inner container to said casing.

5. The combination with a self-heating vessel including an outer shell, a base supporting said shell, an inner container supported within said shell, an electrical resistance surrounding said inner container, an electric circuit within which said resistance is arranged, means disposed in said electrical circuit for automatically controlling the heat supply to the container, said means including an adjustable contact and a movable contact carried by a bi-metallic member, a casing for completely housing said bi-metallic member, a fixed contact disposed in a space provided between said base member and inner container, said casing including a pair of complementary shells within which the bi-metallic member and fixed contact are completely enclosed, and means for securing said shells to each other and to the base and inner container, said last mentioned means including a bolt member having an enlarged tapered head extending through a similarly shaped opening in the inner container and a flexible washer interposed between said head and said opening, whereby the passage of moisture through said opening from said inner container will be prevented.

HERMAN E. LACY.